US007012824B2

(12) United States Patent
Ryu (10) Patent No.: US 7,012,824 B2
(45) Date of Patent: Mar. 14, 2006

(54) VOLTAGE CONVERTING METHOD AND VOLTAGE CONVERTING APPARATUS USING LARGE ELECTROLYTIC CONDENSER

(75) Inventor: Han-chung Ryu, Seongnam-si (KR)

(73) Assignee: Samsung Electronics Co., Ltd., (KR)

( * ) Notice: Subject to any disclaimer, the term of this patent is extended or adjusted under 35 U.S.C. 154(b) by 164 days.

(21) Appl. No.: 10/780,695

(22) Filed: Feb. 19, 2004

(65) Prior Publication Data

US 2004/0252534 A1    Dec. 16, 2004

(30) Foreign Application Priority Data

Jun. 13, 2003 (KR) .................... 10-2003-0038378

(51) Int. Cl.
   *H02M 5/42*    (2006.01)
   *H02M 7/60*    (2006.01)

(52) U.S. Cl. ........................................ 363/89; 363/126

(58) Field of Classification Search ............ 363/52–54, 363/81, 84–89, 92, 125–129
See application file for complete search history.

(56) References Cited

U.S. PATENT DOCUMENTS

| | | | | |
|---|---|---|---|---|
| 4,507,571 A | * | 3/1985 | Callan ........................ | 327/184 |
| 5,552,978 A | * | 9/1996 | Moncorge .................... | 363/89 |
| 5,615,097 A | * | 3/1997 | Cross .......................... | 363/84 |
| 5,804,951 A | * | 9/1998 | Rivet .......................... | 323/223 |
| 5,936,854 A | * | 8/1999 | Uesugi et al. ................ | 363/44 |

OTHER PUBLICATIONS

Keith H. Billings, "Handbook of Switchmode Power Supplies", Chapter 7—Inrush Control, pp. 1.73-1.75, McGraw-Hill Publishing Company (1989).

* cited by examiner

*Primary Examiner*—Matthew V. Nguyen
(74) *Attorney, Agent, or Firm*—Roylance, Abrams, Berdo & Goodman, L.L.P.

(57) ABSTRACT

A voltage converting method and a voltage converting apparatus using a large electrolytic condenser are provided. In the method according to an embodiment of the invention, when the level of an input alternating voltage is equal to or greater than a first predetermined level and smaller than a second predetermined level that is smaller than the first predetermined level, the input alternating voltage is rectified to produce an output direct voltage. When the level of the input alternating voltage is equal to or greater than the second predetermined level, the rectification of the input alternating voltage is stopped. Thereafter, if the provision of the input alternating voltage is stopped and then resumed, the production of the output direct voltage is resumed. Accordingly, the large electrolytic condenser can be protected without physically destroying any device, and the output direct voltage can be immediately produced from the input alternating voltage when the level of the input alternating voltage returns to its normal state. Thus, the production of the output direct voltage is simplified, and unnecessary repair costs are avoided. Also, the cause of inrush current that can be introduced into the large electrolytic condenser is advantageously removed.

14 Claims, 5 Drawing Sheets

VOLTAGE CONVERTING METHOD AND VOLTAGE CONVERTING APPARATUS USING LARGE ELECTROLYTIC CONDENSER

BACKGROUND OF THE INVENTION

This application claims the benefit under 35 U.S.C. §119 (a) of Korean Patent Application No. 2003-38378, filed on Jun. 13, 2003, in the Korean Intellectual Property Office, the disclosure of which is incorporated herein by reference in its entirety.

1. Field of the Invention

The present invention relates to an electrolytic condenser used in a power receiving terminal of various types of electronic apparatuses, and more particularly, to a method and apparatus for converting a voltage using an electrolytic condenser.

2. Description of the Related Art

Generally, all electronic apparatuses include a power receiving terminal to receive external power. As needed, an alternating voltage received by a power receiving terminal (hereinafter, referred to as an input alternating voltage) is converted into a direct voltage (hereinafter, referred to as an output direct voltage). To achieve this, a conventional voltage converting apparatus, such as the power receiving terminal, includes a bridge diode which full-wave rectifies an input alternating voltage and a large electrolytic condenser which charges the full-wave rectified voltage and outputs the charged voltage as an output direct voltage. To prevent explosion of the large electrolytic condenser due to an input alternating voltage of an excessive level, the conventional voltage converting apparatus includes a Zener diode (ZD) installed parallel to the large electrolytic condenser and a fuse installed at the input of the bridge diode. When the large electrolytic condenser receives an input alternating voltage that has a predetermined level or a level greater than the predetermined level which does not exceed a reverse bias voltage of the ZD, the ZD continuously clamps the input alternating voltage so as not to exceed the withstanding of the large electrolytic condenser, thereby protecting the large electrolytic condenser. When the large electrolytic condenser receives an input alternating voltage of an excessive level exceeding the reverse bias voltage of the ZD, the ZD melts and cuts off the fuse while being broken down to a short-circuit state, thereby preventing explosion of the large electrolytic condenser.

Because the conventional voltage converting apparatus cuts off the fuse in order to protect the large electrolytic condenser, repair costs are generated. After the fuse is cut off, even if an input alternating voltage with a normal level is applied, an output direct voltage is not immediately produced from the input alternating voltage until the cut-off fuse is recovered to its original state.

Also, the conventional voltage converting apparatus devises a measure to reduce an inrush current introduced into the large electrolytic condenser. A conventional voltage converting apparatus with such a measure is disclosed in FIG. 1.7.2 at page 10 of "Handbook of Switchmode Power Supplies", written by Keith H. Billings and published by McGraw-Hill Publishing Company in 1989, which is incorporated herein by reference. The disclosed conventional voltage converting apparatus restricts the level of current rushing in a large electrolytic condenser by using a resistance R1 when an input alternating voltage starts being applied. After normally receiving the input alternating voltage, the disclosed conventional voltage converting apparatus turns on a triac by using voltages generated at both ends of a transformer T1 and restricts the level of a current rushing in the large electrolytic condenser.

The level of a sinusoidal input alternating voltage is maximum when its phase is 90° or 270°, and minimum when its phase is 0° or 180°. Nevertheless, because the conventional voltage converting apparatus restricts an inrush current regardless of the phase of the input alternating voltage, it may generate an excessive level of inrush current when the phase of the input alternating voltage is 90° or 270°. Also, the conventional voltage converting apparatus cannot completely remove the inrush current.

SUMMARY OF THE INVENTION

One aspect of the present invention provides a voltage converting method using a large electrolytic condenser, by which an input alternating voltage can be converted into an output direct voltage while protecting the large electrolytic condenser from an inrush current or an excessive level of the input alternating voltage.

Another aspect of the present invention provides a voltage converting apparatus using a large electrolytic condenser, by which an input alternating voltage can be converted into an output direct voltage while protecting the large electrolytic condenser from an inrush current or an excessive level of the input alternating voltage.

According to one aspect of the present invention, there is provided a method of converting an input alternating voltage into an output direct voltage using a large electrolytic condenser. In this method, first, it is determined whether the level of the input alternating voltage is equal to or greater than a first predetermined level. Next, if the level of the input alternating voltage is equal to or greater than the first predetermined level, the input alternating voltage is rectified to produce the output direct voltage. Thereafter, it is determined whether the level of the input alternating voltage is equal to or greater than a second predetermined level that is greater than the first predetermined level. Then, if the level of the input alternating voltage is equal to or greater than the second predetermined level, the rectification of the input alternating voltage is stopped. Then, it is determined whether the provision of the input alternating voltage is stopped and then resumed. If it is determined that the provision of the input alternating voltage is resumed, the method goes back to the step of determining whether the level of the input alternating voltage is equal to or greater than a first predetermined level.

According to another aspect of the present invention, there is provided an apparatus for converting an input alternating voltage into an output direct voltage using a large electrolytic condenser. This apparatus includes a level detector, a selection signal producer, a direct voltage producer, a voltage transmitter, and a controller. The level detector detects the level of the input alternating voltage. The selection signal producer produces a selection signal from a control signal and the result of a comparison of the detected level of the input alternating voltage with a first predetermined level. The direct voltage producer rectifies the input alternating voltage and outputs the result of the rectification as the output direct voltage. The voltage transmitter transmits the input alternating voltage to the direct voltage producer in response to the selection signal. The controller produces the control signal from the result of a comparison of the detected level of the input alternating voltage with a second predetermined level greater than the first predetermined level and the result of a determination whether the provision of the input alternating voltage is stopped and then resumed.

BRIEF DESCRIPTION OF THE DRAWINGS

The above and other features and advantages of the present invention will become more apparent by describing in detail exemplary embodiments thereof with reference to the attached drawing figures in which.

In the drawing figures it will be understood that like reference numerals refer to like features and structures.

DETAILED DESCRIPTION OF THE INVENTION

Hereinafter, a voltage converting method using a large electrolytic condenser according to an embodiment of the present invention will be described with reference to the accompanying drawing figures.

Figure 1:
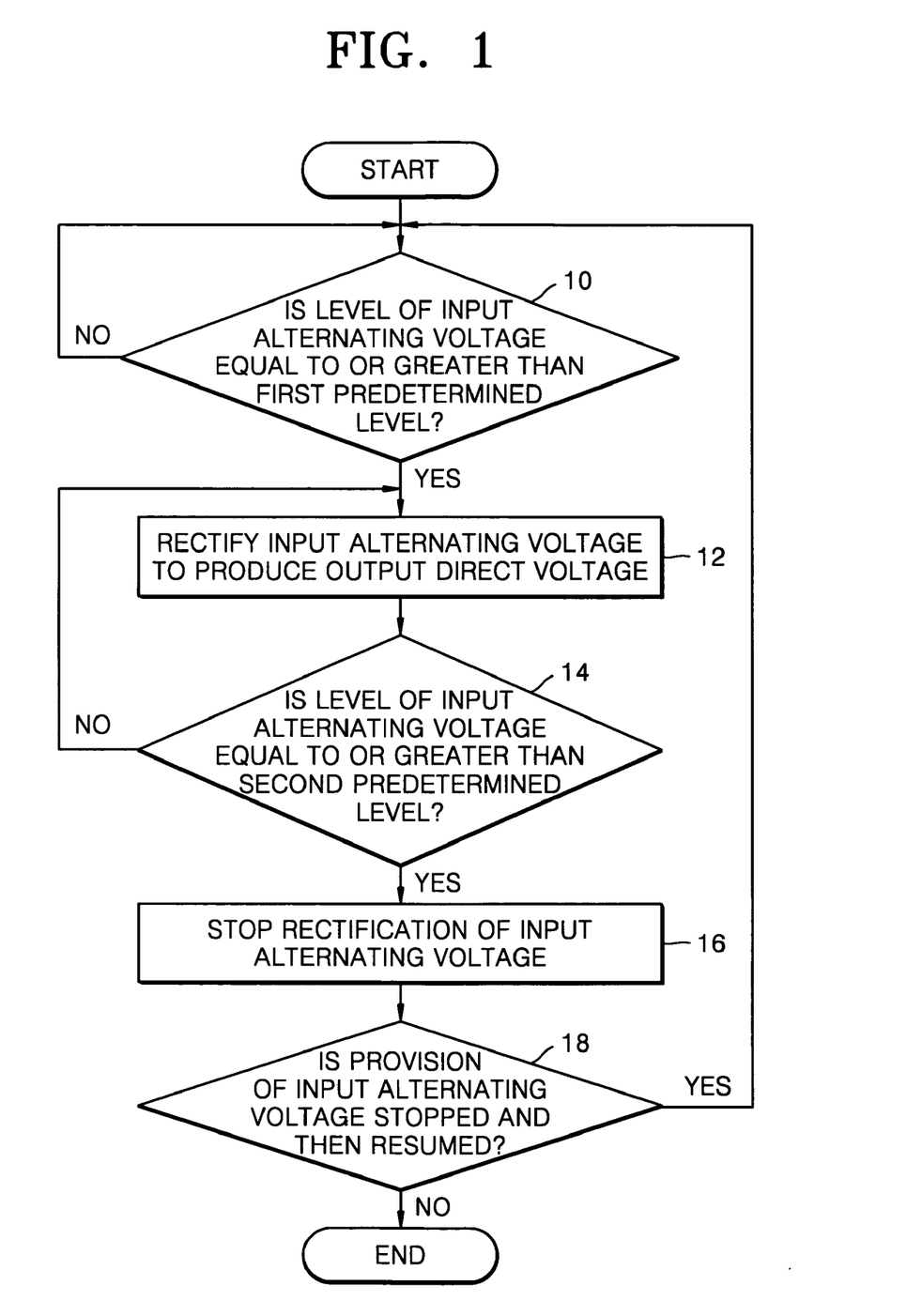
FIG. 1 is a flowchart illustrating a voltage converting method according to an embodiment of the present invention.

FIG. 1 is a flowchart illustrating a voltage converting method according to an embodiment of the present invention. This voltage converting method includes steps 10 through 16, in which when the level of an input alternating voltage is not less than a first predetermined level and less than a second predetermined level, the input alternating voltage is rectified to produce an output direct voltage, and step 18, in which after the rectification of the input alternating voltage is stopped, it is determined whether the provision of the input alternating voltage is stopped and then resumed.

In a voltage converting method according to an embodiment of the present invention, an input alternating voltage is converted into an output direct voltage using a large electrolytic condenser as described below. The large electrolytic condenser denotes an electrolytic condenser with a capacity large enough to potentially generate a fire when it receives an excess voltage. The input alternating voltage may be a common alternating voltage with a level of 100V or 220V.

In a voltage converting method according to an embodiment of the present invention, first, in step 10, it is determined whether the level of an input alternating voltage is equal to or greater than a first predetermined level. If a large electrolytic condenser is installed at the power receiving terminal of an electronic apparatus, the input alternating voltage may be a common alternating voltage as described above. The first predetermined level denotes the level of an input alternating voltage at which an electronic apparatus can normally operate.

If the level of the input alternating voltage is smaller than the first predetermined level, step 10 is re-performed. On the other hand, if the level of the input alternating voltage is equal to or greater than the first predetermined level, the input alternating voltage is rectified to generate an output direct voltage, in step 12.

Thereafter, in step 14, it is determined whether the level of the input alternating voltage is equal to or greater than a second predetermined level. The second predetermined level denotes the level of an input alternating voltage which is greater than the first predetermined level and has a possibility of causing a malfunction of the large electrolytic condenser. As an example, if the level of the input alternating voltage to be compared with the first and second predetermined levels is a Root Means Square (RMS) value, and if a common alternating voltage having a level ranging between 180V and 270V in a normal state is converted into an output direct voltage according to the voltage converting method according to an embodiment of the present invention, the first predetermined level may be $180\sqrt{2}+\Delta$ (where $\Delta$ denotes an error), and the second predetermined level may be $270\sqrt{2}+\Delta$. Similarly, if a common alternating voltage having a level ranging between 90V and 136V in a normal state is converted into an output direct voltage, the first predetermined level may be $90\sqrt{2}+\Delta$, and the second predetermined level may be $135\sqrt{2}+\Delta$.

If it is determined in step 14 that the level of the input alternating voltage is smaller than the second predetermined level, the method goes back to step 12 to continue converting the input alternating voltage into an output direct voltage. On the other hand, if it is determined in step 14 that the level of the input alternating voltage is equal to or greater than the second predetermined level, the rectification of the input alternating voltage is stopped, in step 16. Hence, malfunction of the large electrolytic condenser due to the input alternating voltage exceeding the second predetermined level is prevented.

In step 18, it is determined whether the provision of the input alternating voltage is stopped and then resumed. If it is determined after step 16 that the provision of the input alternating voltage is stopped and then not resumed, or if it is determined after step 16 that the provision of the input alternating voltage is never stopped, the voltage converting method of FIG. 1 is concluded. If it is determined after step 16 that the provision of the input alternating voltage is stopped and then resumed, the method goes back to step 10.

In a conventional voltage converting method, if the level of the input alternating voltage is equal to or greater than the second predetermined level, a fuse is cut off in order to prevent explosion of a large electrolytic condenser. Accordingly, even if an input alternating voltage is normally provided later, an output direct voltage can be produced only after the fuse is repaired. However, in the voltage converting method according to an embodiment of the present invention, if the level of the input alternating voltage is equal to or greater than the second predetermined level, the rectification of the input alternating voltage is stopped. Thereafter, if the provision of the input alternating voltage is stopped and then resumed, an output direct voltage can advantageously be immediately produced from the input alternating voltage without a special repair process.

Figure 2:
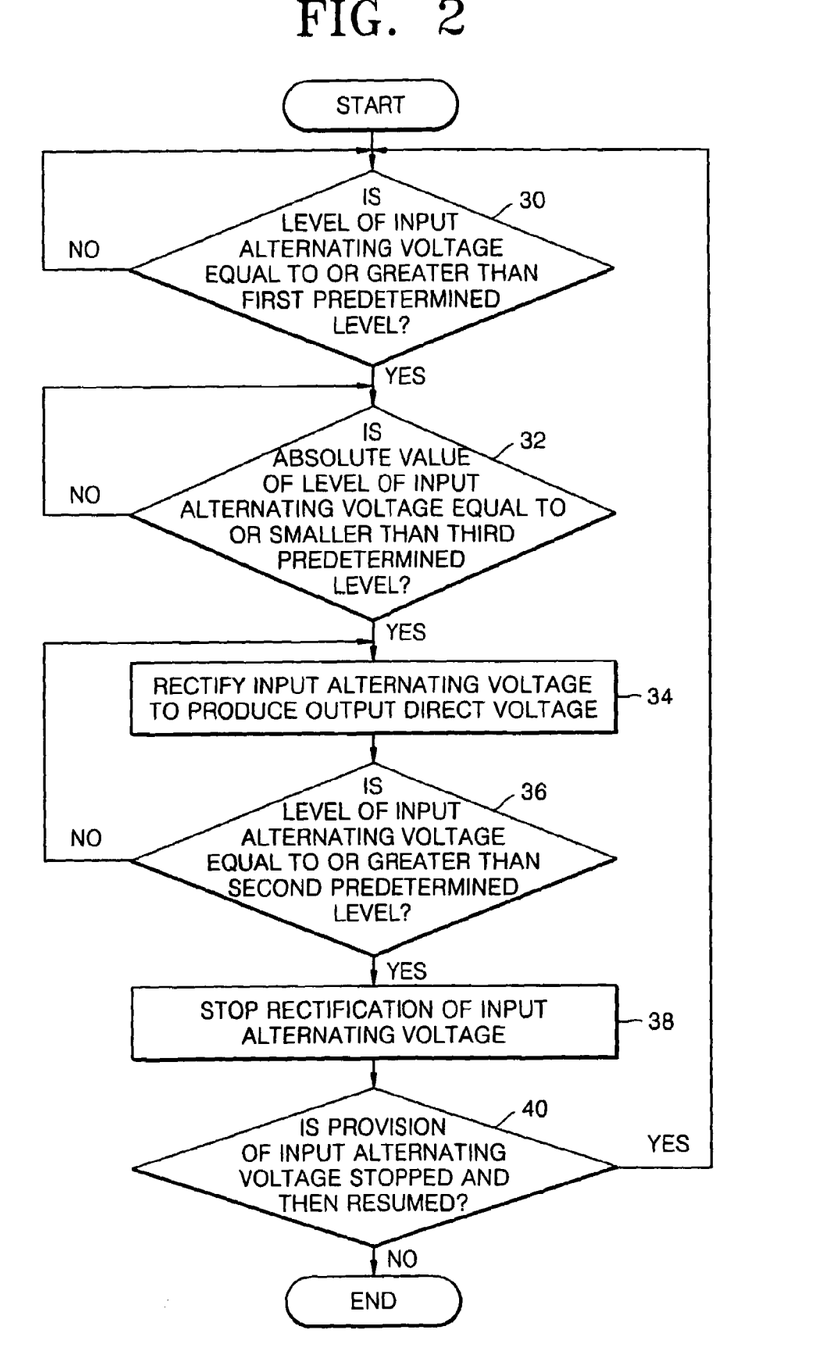
FIG. 2 is a flowchart illustrating a voltage converting method according to another embodiment of the present invention.

FIG. 2 is a flowchart illustrating a voltage converting method according to another embodiment of the present invention. This method includes steps 30 through 38, in which if the level of an input alternating voltage that is equal to or greater than a first predetermined level and equal to or smaller than a third predetermined level, the input alternating voltage is rectified to produce an output direct voltage, and step 40, in which after the rectification of the input alternating voltage is stopped, it is determined whether the provision of the input alternating voltage is stopped and then resumed.

Since steps 30, 34, 36, 38, and 40 of FIG. 2 perform substantially the same operations as those of steps 10, 12, 14, 16, and 18 of FIG. 1, they will not be described in detail.

Referring to FIG. 2, if it is determined in step 30 that the level of the input alternating voltage is equal to or greater than the first predetermined level, it is determined whether the absolute value of the level of the input alternating voltage is smaller than or equal to the third predetermined level, in step 32. The third predetermined level denotes a value approximate to the smallest value among the absolute values of the levels of an input alternating voltage. If an input alternating voltage is sinusoidal, the absolute value of the level of the input alternating voltage is minimum when the phase is $n\pi$ (where n is 0, 1, 2, 3, . . . ). If an input alternating voltage is cosinusoidal, the absolute value of the level of the input alternating voltage is minimum when the phase is $(n'-1/2)\pi$ (where n' is 0, 1, 2, 3, . . . ).

If it is determined in step 32 that the absolute value of the level of the input alternating voltage is smaller than or equal to the third predetermined level, the input alternating voltage is rectified to produce an output direct voltage, in step 34. As described above, in the voltage converting method according to an embodiment of the present invention, the output direct voltage is produced using the large electrolytic condenser only if the absolute value of the level of the input alternating voltage is smaller than or equal to the third predetermined level. Thus, generation of inrush current due to provision of the input alternating voltage with a large level can be prevented.

The structure and operation of a voltage converting apparatus using a large electrolytic condenser according to an embodiment of the present invention will now be described in detail with reference to the accompanying drawings.

Figure 3:
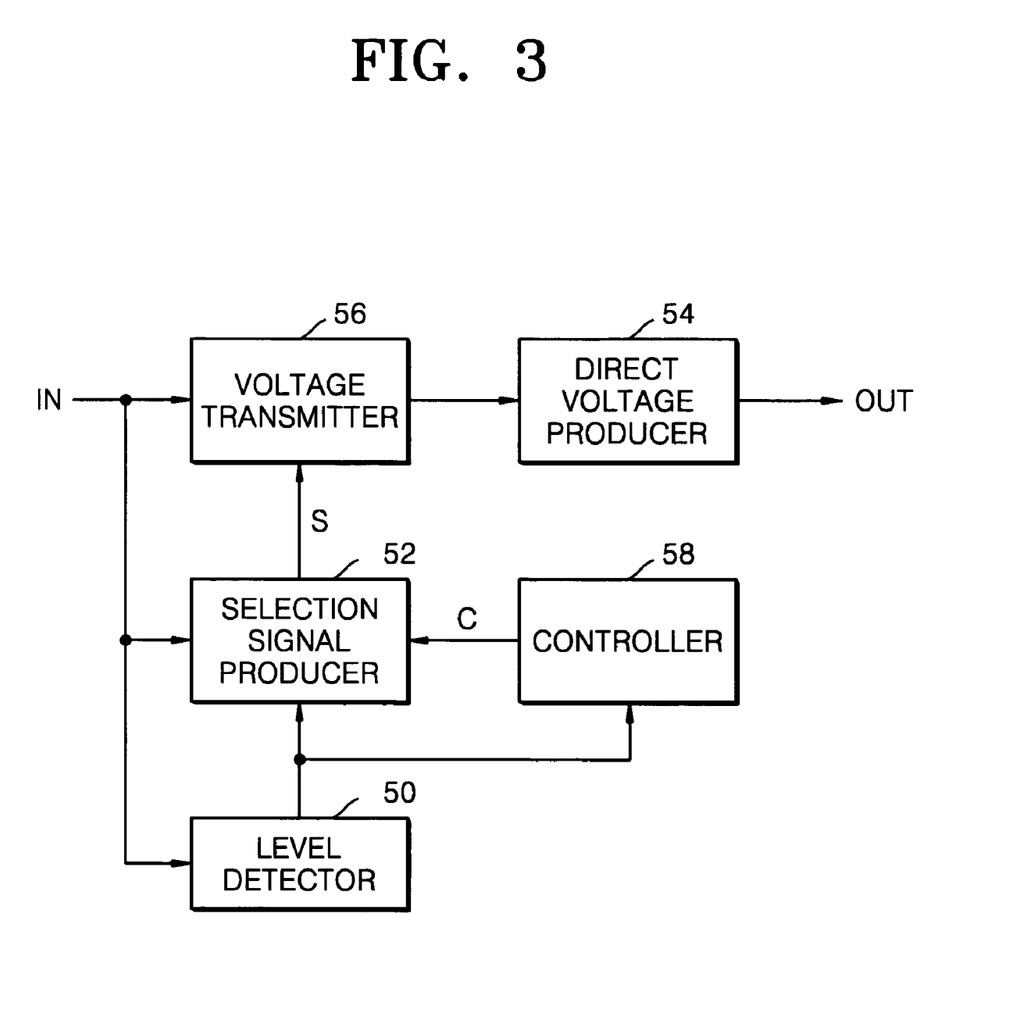
FIG. 3 is a block diagram of a voltage converting apparatus according to an embodiment of the present invention.

FIG. 3 is a block diagram of a voltage converting apparatus according to an embodiment of the present invention, which includes a level detector 50, a selection signal producer 52, a direct voltage producer 54, a voltage transmitter 56, and a controller 58.

The voltage converting apparatus of FIG. 3 converts an input alternating voltage into an output direct voltage using the large electrolytic condenser. To achieve this, the level detector 50 detects the level of the input alternating voltage received via an input terminal IN and outputs the detected level to the selection signal producer 52 and the controller 58.

If the voltage converting apparatus of FIG. 3 performs the voltage converting method of FIG. 1, the selection signal producer 52 produces a selection signal S from the result of a comparison between the detected level of the input alternating voltage, which is received from the level detector 50, and the first predetermined level and a control signal C received from the controller 58 and outputs the selection signal S to the voltage transmitter 56.

If the voltage converting apparatus of FIG. 3 performs the voltage converting method of FIG. 2, the selection signal producer 52 produces a selection signal S from the result of a comparison of the detected level of the input alternating voltage, which is received from the level detector 50, with the first predetermined level, the result of a comparison of the absolute value of the level of the input alternating voltage received via the input terminal IN with the third predetermined level, and the control signal C received from the controller 58. The selection signal S is applied to the voltage transmitter 56.

The controller 58 produces the control signal C from the result of a comparison of the detected level of the input alternating voltage, which is received from the level detector 50, with the second predetermined level and the result of a determination whether the provision of the input alternating voltage is stopped and then resumed. Then, the controller 58 outputs the produced control signal C to the selection signal producer 52.

The voltage transmitter 56 transmits the input alternating voltage received via the input terminal IN, to the direct voltage producer 54 in response to the selection signal S received from the selection signal producer 52. As described above, the voltage transmitter 56 serves as an alternating switch which is turned on or off in response to the selection signal S.

The direct voltage producer 54 rectifies the input alternating voltage received from the voltage transmitter 56 and outputs the result of the rectification as the output direct voltage via an output terminal OUT.

The voltage converting apparatus of FIG. 3 having such a configuration executes the voltage converting method of FIG. 1 or 2.

For example, the level detector 50 and the selection signal producer 52 execute step 10 or 30. The level detector 50 detects the level of the input alternating voltage received via the input terminal IN, and the selection signal producer 52 compares the detected level of the input alternating voltage, which is received from the level detector 50, with the first predetermined level. The selection signal producer 52 outputs the result of the comparison as the selection signal S to the voltage transmitter 56.

The voltage transmitter 56 and the direct voltage producer 54 execute step 12 of FIG. 1. That is, the voltage transmitter 56 transmits the input alternating voltage received via the input terminal IN to the direct voltage producer 54 in response to the selection signal S, which is generated when the level of the input alternating voltage is equal to or greater than the first predetermined level or when the level of the input alternating voltage is smaller than the second predetermined level. The direct voltage producer 54 rectifies the input alternating voltage received from the voltage transmitter 56 and outputs the result of the rectification as the output direct voltage via the output terminal OUT.

The level detector 50 and the selection signal producer 52 execute step 32 of FIG. 2. The selection signal producer 52 compares the absolute value of the level of the input alternating voltage received via the input terminal IN with the third predetermined level and produces the selection signal S based on the result of the comparison. The voltage transmitter 56 and the direct voltage producer 54 execute step 34 of FIG. 2. That is, the voltage transmitter 56 transmits the input alternating voltage received via the input terminal IN to the direct voltage producer 54 in response to the selection signal S, which is generated when the detected level of the input alternating voltage is equal to or greater than the first predetermined level and smaller than the second predetermined level and the absolute value of the level of the input alternating voltage is smaller than or equal to the third predetermined level. As described above, the direct voltage producer 54 converts the input alternating voltage received from the voltage transmitter 56 into the output direct voltage.

To perform step 14 or step 36, the controller 58 compares the detected level of the input alternating voltage, which is received from the level detector 50, with the second predetermined level and outputs the result of the comparison as the control signal C. If it is determined from the control signal C that the level of the input alternating voltage is smaller than the second predetermined level, the selection signal producer 52 produces the selection signal S, which is used in order for the voltage transmitter 56 to transmit the input alternating voltage received via the input terminal IN to the direct voltage producer 54.

Figure 4:
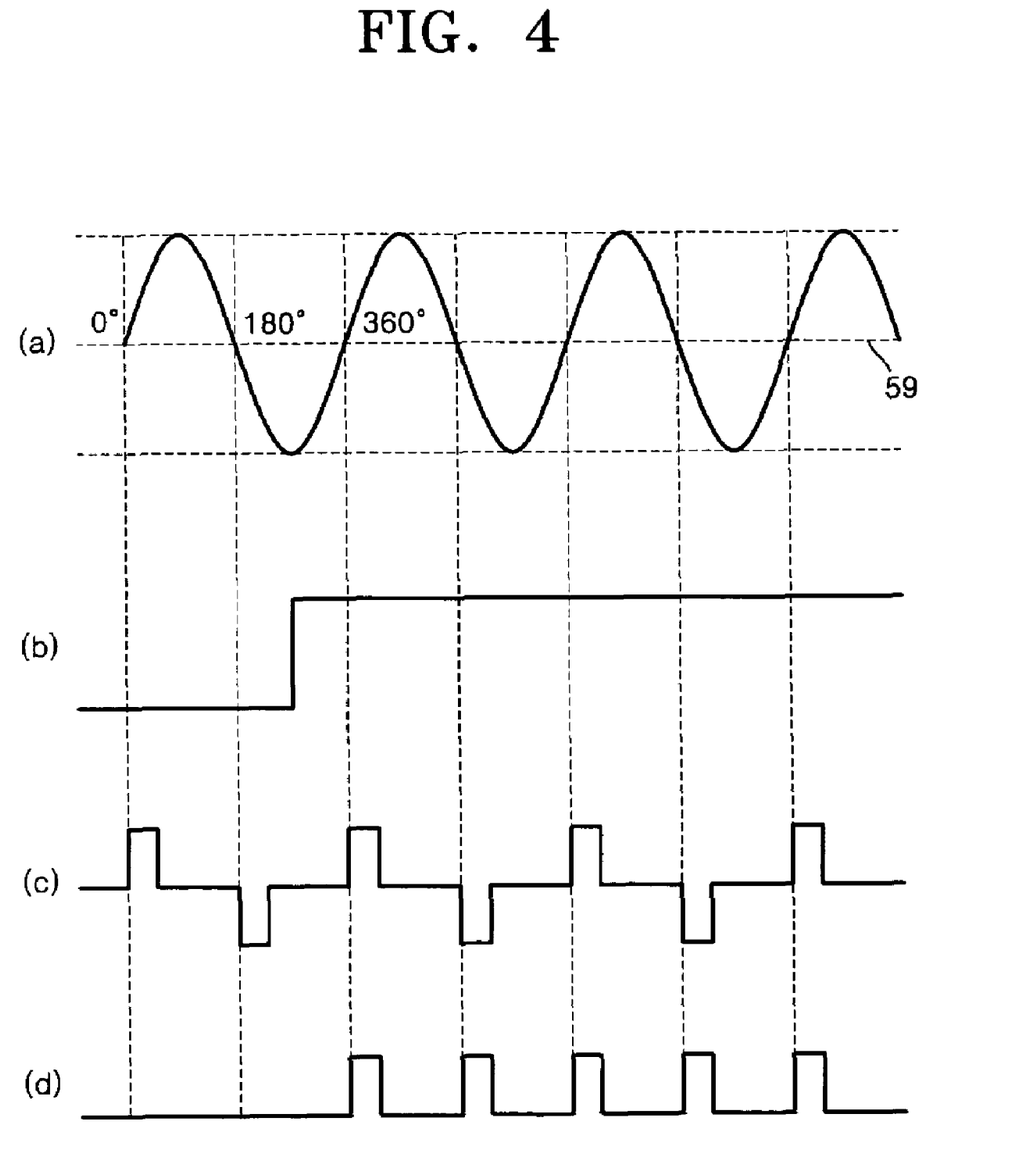
FIG. 4 shows waveforms for illustrating the operation of the selection signal producer of FIG. 3.

FIG. 4(a) through (d) are waveform diagrams for illustrating the operation of the selection signal producer 52 of FIG. 3. FIG. 4(a) shows a waveform of the input alternating voltage, FIG. 4(b) shows a waveform of the control signal C, FIG. 4(c) shows a zero crossing waveform, and FIG. 4(d) shows a waveform of the selection signal S.

If the voltage converting apparatus of FIG. 3 performs the voltage converting method of FIG. 2, the selection signal producer 52 receives an input alternating voltage as shown in FIG. 4(a) via the input terminal IN and produces a zero crossing waveform as shown in FIG. 4(c) when the level of the received input alternating voltage passes a reference voltage, for example, zero 59. In other words, the zero crossing waveform is generated when the absolute value of the level of the input alternating voltage is a minimum value, that is, zero. As shown in FIG. 4(c), the level of the zero crossing waveform when the level of the input alternating voltage passes the zero 59 while decreasing may be opposite to that when the level of the input alternating voltage passes the zero 59 while increasing. It is assumed that when the detected level of the input alternating voltage is smaller than the second predetermined level, a control signal C of a high logic level as shown in FIG. 4(b) is generated by the controller 58, and that when the detected level of the input alternating voltage is equal to or greater than the second predetermined level, a control signal C of a low logic level is generated by the controller 58. When the control signal C of a high logic level as shown in FIG. 4(b) is generated and a zero crossing waveform as shown in FIG. 4(c) is generated, a selection signal S as shown in FIG. 4(d) may be generated. Every time the selection signal S of a high logic level is received as shown in FIG. 4(d), the voltage transmitter 56 transmits the input alternating voltage to the direct voltage producer 54.

If the voltage converting apparatus of FIG. 3 performs the voltage converting method of FIG. 1, the selection signal producer 52 does not need to produce an extra zero crossing waveform. In this case, the voltage transmitter 56 transmits the input alternating voltage to the direct voltage producer 54 in response to the selection signal S, which is generated when the detected level of the input alternating voltage is greater than or equal to the first predetermined level and smaller than the second predetermined level.

The selection signal producer 52 and the voltage transmitter 56 of FIG. 3 execute step 16 or 38. To be more specific, when it is recognized from the control signal C that the detected level of the input alternating voltage is greater than or equal to the second predetermined level, the selection signal producer 52 produces the selection signal S, for example, a selection signal S of a low logic level as shown in FIG. 4(d), in order to prevent the voltage transmitter 56 from transmitting the input alternating voltage received via the input terminal IN to the direct voltage producer 54. Hence, when the direct voltage producer 54 does not receive the input alternating voltage from the voltage transmitter 56, it stops the rectification of the input alternating voltage.

The controller 58 executes step 18 or 40. To be more specific, after the control signal C is generated so that the rectification of the input alternating voltage is stopped, the controller 58 checks whether the provision of the input alternating voltage is stopped and then resumed, produces a new control signal C from the result of the determination, and outputs the new control signal C to the selection signal producer 52. Accordingly, if it is recognized from the new control signal C that, after the rectification of the input alternating voltage is stopped, the provision of the input alternating voltage is stopped and then resumed, the selection signal producer 52 checks whether the level of the input alternating voltage detected in the level detector 50 is equal to or greater than the first predetermined level, in order to achieve step 10 or 30.

The structure and operation of an embodiment of the voltage converting apparatus according to the present invention of FIG. 3 will now be described with reference to the accompanying drawings.

Figure 5:
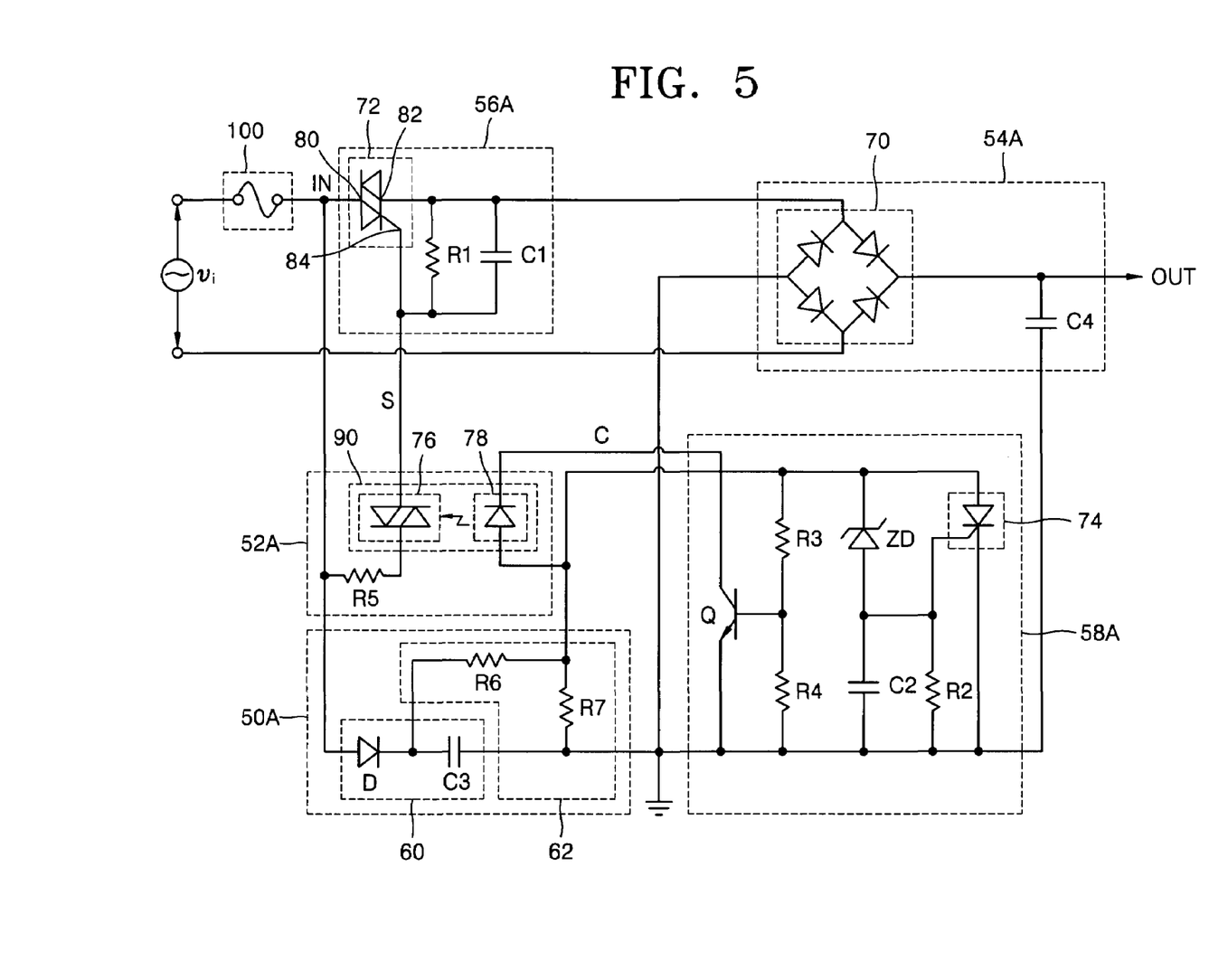
FIG. 5 is a circuit diagram of an embodiment of the voltage converting apparatus of FIG. 3.

FIG. 5 is a circuit diagram of an embodiment of the voltage converting apparatus of FIG. 3. The embodiment includes a level detector 50A, a selection signal producer 52A, a direct voltage producer 54A, a voltage transmitter 56A, a controller 58A, and a fuse 100.

The voltage transmitter 56A can be composed of a triac 72, a first resistor R1, and a first capacitor C1. The triac 72 includes first and second main electrodes 80 and 82, which are respectively coupled to an input alternating voltage $v_i$ and the direct voltage producer 54A, and a gate 84 coupled to a selection signal S. The triac 72 transmits the input alternating voltage $v_i$ received via an input terminal IN to the direct voltage producer 54 in response to the selection signal S received via the gate 84 from the selection signal producer 52A. The first resistor R1 is installed between the second electrode 82 and the gate 84 of the triac 72, and the first capacitor C1 is installed parallel to the first resistor R1. The first resistor R1 and the first capacitor C1 protect the triac 72.

The controller 58A can be composed of second, third, and fourth resistors R2, R3, and R4, a second capacitor C2, a Zener diode (ZD), a transistor Q, and a silicon controlled rectifier (SCR) 74. The SCR 74 has an anode and a cathode that are respectively coupled to the coupling point between the resistors R6 and R7, through which the detected level of the input alternating voltage $v_i$ is output from the level detector 50A, and a reference voltage, for example, a ground. The second resistor R2 is coupled between the gate of the SCR 74 and the reference voltage, and the second capacitor C2 is installed parallel to the second resistor R2. In other words, the second capacitor C2 is coupled between the anode of the ZD and the reference voltage. The second resistor R2 and the second capacitor C2 protect the SCR 74. The ZD has a reverse bias voltage corresponding to the second predetermined level, and a cathode connected to the detected level of the input alternating voltage, which is received from the level detector 50A. The third and fourth resistors R3 and R4 are serially connected to each other between the coupling point between the resistors R6 and R7, through which the detected level of the input alternating voltage $v_i$ is output, and the reference voltage. The transistor Q has a base coupled between the third and fourth resistors R3 and R4 and a collector and an emitter that are installed between the control signal C and the reference voltage. According to the present invention, the controller 58A may include a switching element instead of the transistor Q.

The selection signal producer 52A may be composed of a fifth resistor R5, a light emitter 78, and a light receiver 76. One end of the fifth resistor R5 is coupled to the input alternating voltage $v_i$. The light emitter 78 is coupled between the coupling point between the resistors R6 and R7, through which the detected level of the input alternating voltage $v_i$ is output from the level detector 50A, and the control signal C received from the controller 58A. The light emitter 78 is preferably implemented as a light emitting diode. The light receiver 76 is coupled between the other end of the fifth resister R5 and the selection signal S. The light emitter 78 and the light receiver 76 constitute a photo triac 90.

The level detector 50A may be composed of a first rectifier 60 and a level controller 62. The first rectifier 60 rectifies the input alternating voltage $v_i$ and outputs the result of the rectification to the level controller 62. To do this, the first rectifier 60 can be composed of a diode (D) whose anode is coupled to the input alternating voltage $v_i$, and a third capacitor C3 coupled between the cathode of the diode D and the reference voltage. The level controller 62 controls downward the level of the result of the rectification by the first rectifier 60, that is, the level of a voltage caught in both ends of the third capacitor C3, and the result of the level controlling as the detected level of the input alternating voltage $v_i$ to the selection signal producer 52A and the controller 58A. To achieve this, the level controller 62 may be composed of a sixth resistor R6 whose one end is coupled to the cathode of the diode D, and a seventh resistor R7 whose one end is coupled to the other end of the sixth resistor R6 and the other end is coupled to the reference voltage.

To produce an output direct voltage, the direct voltage producer 54A can be composed of a second rectifier 70 and a large electrolytic condenser C4. The second rectifier 70 full-wave or half-wave rectifies the input alternating voltage $v_i$ received from the voltage transmitter 56A. If the second rectifier 70 full-wave rectifies the input alternating voltage $v_i$, it can be implemented as a bridge diode as shown in FIG. 5. The large electrolytic condenser C4 charges from the rectification by the second rectifier 70 and outputs the result of the charging as an output direct voltage to a load (not shown) or the like via an output terminal OUT.

In the voltage converting apparatus of FIG. 5 having the above-described structure, when the input alternating voltage $v_i$ starts being received by the voltage transmitter 56A, the triac 72 has been turned off. At this time, the result of the rectification performed by the diode D and the third capacitor C3 is divided by the sixth and seventh resistors R6 and R7. The division result, that is, the detected level of the input alternating voltage, is applied to the anode of the light emission diode 78 and to the controller 58A. The controller 58A divides the detected level of the input alternating voltage $v_i$ using the third and fourth resistors R3 and R4. At this time, because the detected level of the input alternating voltage $v_i$ is smaller than the second predetermined level, which is the reverse bias voltage of the ZD, the transistor Q is turned on. Hence, a current may flow to the reference voltage via the diode D, the sixth resistor R6, the light emitter 78, and the transistor Q. As described above, when the light emitter 78 emits light, the light receiver 76 can receive the emitted light, and consequently, the photo triac 90 is turned on. Hence, the selection signal S is applied to the gate 84 of the triac 72, and accordingly, the input alternating voltage $v_i$ can be transmitted to the direct voltage producer 54A. For example, the photo triac 90 turned on by the turning-on of the transistor Q produces the selection signal S of FIG. 4(d) in response to the zero crossing pulses of FIG. 4(c), which are generated when the phase of the input alternating voltage $v_i$ of FIG. 4(a) is 0° or 180°, that is, when the level of the input alternating voltage $v_i$ is minimum, and applies the produced selection signal S to the gate 84 of the triac 72 of the voltage transmitter 56A. Hence, the triac 72 is turned on to transmit the input alternating voltage $v_i$ to the direct voltage producer 54A. Then, the direct voltage producer 54A rectifies the input alternating voltage $v_i$ to produce the output direct voltage.

However, when the level of the input alternating voltage $v_i$, which is output from the level detector 50A, is equal to or greater than the second predetermined level, which is a reverse bias voltage of the ZD, the ZD is broken down, and accordingly, the SCR 74 is latched up. If the SCR 74 is latched up, the transistor Q is turned off. If the transistor Q is turned off, the light emitter 78 does not emit light. Hence, the selection signal producer 52A applies the selection signal S of a low logic level to the gate 84 of the triac 72. Accordingly, the triac 72 is turned off and does not transmit the input alternating voltage $v_i$ to the direct voltage producer 54A. Consequently, explosion of the large electrolytic condenser C4 by an excess voltage can be prevented. Even if the level of the input alternating voltage $v_i$ becomes smaller than the second predetermined level, the SCR 74 keeps its latched-up state. Thus, to cancel the latched-up state of the SCR 74, the provision of the input alternating voltage $v_i$ first must be stopped and then resumed.

The voltage converting apparatus of FIG. 5 may further include the fuse 100, which is coupled between the input alternating voltage $v_i$ and the level detector 50A.

In a conventional method of converting an input alternating voltage into an output direct voltage using a large electrolytic condenser, a fuse is physically cut off in order to prevent explosion of the large electrolytic condenser that may be caused by an input alternating voltage that has a gradually increasing level or an excess level. However, in a voltage converting method and a voltage converting apparatus using a large electrolytic condenser according to an embodiment of the present invention, the large electrolytic condenser can be protected without physically destroying any device, and accordingly, an output direct voltage can be immediately produced from an input alternating voltage when the level of the input alternating voltage returns to its normal state. Thus, the production of the output direct voltage is easier, and extra repair costs are not generated. When the level of the input alternating voltage is the lowest, the input alternating voltage is rectified to produce the output direct voltage. Thus, the cause of an inrush current that can be introduced into the large electrolytic condenser is removed.

What is claimed is:

1. A method of converting an input alternating voltage into an output direct voltage using a large electrolytic condenser, the method comprising the steps of:
   (a) determining whether the level of the input alternating voltage is equal to or greater than a first predetermined level;
   (b) rectifying the input alternating voltage to produce the output direct voltage if the level of the input alternating voltage is equal to or greater than the first predetermined level;
   (c) determining whether the level of the input alternating voltage is equal to or greater than a second predetermined level that is greater than the first predetermined level;
   (d) stopping the rectification of the input alternating voltage if the level of the input alternating voltage is equal to or greater than the second predetermined level; and
   (e) if said rectification is stopped, determining whether the provision of the input alternating voltage is stopped and then resumed and proceeding to step (a) if it is determined that the input alternating voltage has been stopped and then resumed.

2. The method of claim 1, wherein the input alternating voltage is a common alternating voltage.

3. The method of claim 1, further comprising the step of:
(f) determining whether the absolute value of the level of the input alternating voltage is smaller than or equal to a third predetermined level if it is determined that the absolute value of the level of the input alternating voltage is greater than or equal to the first predetermined level,
wherein in step (b) if the absolute value of the level of the input alternating voltage is smaller than or equal to the third predetermined level, the input alternating voltage is rectified.

4. The method of claim 3, wherein the third predetermined level is smaller than the second predetermined level.

5. The method of claim 3, wherein the third predetermined level is the smallest value among the absolute values of the levels of the input alternating voltage.

6. An apparatus for converting an input alternating voltage into an output direct voltage using a large electrolytic condenser, the apparatus comprising:
a level detector adapted to detect the level of the input alternating voltage;
a selection signal producer adapted to produce a selection signal based on a control signal and the result of a comparison of the detected level of the input alternating voltage with a first predetermined level;
a direct voltage producer adapted to rectify the input alternating voltage and output the result of the rectification as the output direct voltage;
a voltage transmitter adapted to transmit the input alternating voltage to the direct voltage producer in response to the selection signal; and
a controller adapted to produce the control signal from the result of a comparison of the detected level of the input alternating voltage with a second predetermined level greater than the first predetermined level and the result of a determination whether the provision of the input alternating voltage is stopped and then resumed.

7. The apparatus of claim 6, wherein the selection signal producer is adapted to produce the selection signal from the control signal, the result of the comparison of the detected level of the input alternating voltage with the first predetermined level, and the result of a comparison of the absolute value of the detected level of the input alternating voltage with a third predetermined level, wherein the third predetermined level is smaller than the second predetermined level.

8. The apparatus of claim 7, wherein the third predetermined level is the smallest value among the absolute values of the levels of the input alternating voltage.

9. The apparatus of claim 6, wherein the level detector comprises:
a first rectifier adapted to rectify the input alternating voltage; and
a level controller adapted to control downward the level of the input alternating voltage rectified by the first rectifier and output the controlled level of the input alternating voltage as the detected level of the input alternating voltage.

10. The apparatus of claim 6, wherein the direct voltage producer comprises:
a second rectifier adapted to rectify the input alternating voltage; and
wherein the large electrolytic condenser is adapted to charge from the input alternating voltage rectified by the second rectifier and output the charged input alternating voltage as the output direct voltage.

11. The apparatus of claim 6, wherein the voltage transmitter comprises:
a triac having first and second main electrodes respectively connected to the input alternating voltage and the direct voltage producer, and a gate coupled to the selection signal;
a first resistor installed between the second main electrode and the gate of the triac; and
a first capacitor connected to the first register in parallel.

12. The apparatus of claim 6, wherein the controller comprises:
a silicon control rectifier having an anode and a cathode both connected between the detected level of the input alternating voltage and a reference voltage;
a second resistor coupled between a gate of the silicon control rectifier and the reference voltage;
a Zener diode having a reverse bias voltage of the second predetermined level, and a cathode connected to the detected level of the input alternating voltage;
a second capacitor coupled between an anode of the Zener diode and the reference voltage;
third and fourth resistors connected to each other in series between the detected level of the input alternating voltage and the reference voltage; and
a transistor having a base coupled between the third and fourth resistors and a collector and an emitter installed between the control signal and the reference voltage.

13. The apparatus of claim 7, wherein the selection signal producer comprises:
a fifth resistor, one end of which is coupled to the input alternating voltage;
a light emitter connected between the detected level of the input alternating voltage and the control signal, adapted to emit light; and
a light receiver connected between the other end of the fifth resistor and the selection signal, adapted to receive light.

14. The apparatus of claim 6, further comprising a fuse coupled between the input alternating voltage and the level detector.

* * * * *